United States Patent
Liu et al.

(10) Patent No.: US 10,745,535 B2
(45) Date of Patent: Aug. 18, 2020

(54) SPONGE FOR OIL-WATER SEPARATION AND COMPOSITION FOR MAKING THE SAME

(71) Applicant: Chen Chi Hsiang Industry Limited, Taichung (TW)

(72) Inventors: Yu-Hsiang Liu, Taichung (TW); Shih-Chung Chen, Taichung (TW)

(73) Assignee: Chen Chi Hsiang Industry Limited, Taichung (TW)

( * ) Notice: Subject to any disclaimer, the term of this patent is extended or adjusted under 35 U.S.C. 154(b) by 114 days.

(21) Appl. No.: 16/039,970

(22) Filed: Jul. 19, 2018

(65) Prior Publication Data

US 2019/0300672 A1    Oct. 3, 2019

(30) Foreign Application Priority Data

Mar. 27, 2018  (TW) .............................. 107110525 A

(51) Int. Cl.

| | |
|---|---|
| *C08G 18/20* | (2006.01) |
| *C08G 18/32* | (2006.01) |
| *C08G 18/40* | (2006.01) |
| *C08G 18/42* | (2006.01) |
| *C08G 18/48* | (2006.01) |
| *C08G 18/63* | (2006.01) |
| *C08G 18/76* | (2006.01) |
| *C08J 9/00* | (2006.01) |
| *C08J 9/236* | (2006.01) |
| *C08K 3/04* | (2006.01) |
| *C08L 75/08* | (2006.01) |
| *C08K 5/053* | (2006.01) |
| *C08G 18/18* | (2006.01) |

(52) U.S. Cl.
CPC .............. *C08J 9/236* (2013.01); *C08K 3/042* (2017.05); *C08K 5/053* (2013.01); *C08L 75/08* (2013.01); *C08G 18/1808* (2013.01); *C08G 18/3206* (2013.01); *C08G 18/4804* (2013.01); *C08G 18/4833* (2013.01); *C08G 18/63* (2013.01); *C08J 9/0066* (2013.01)

(58) Field of Classification Search
CPC ............ C08G 18/3206; C08G 18/4804; C08G 18/4833; C08G 18/63; C08J 9/0066; C08K 3/042
See application file for complete search history.

(56) References Cited

U.S. PATENT DOCUMENTS

| | | | |
|---|---|---|---|
| 6,617,369 B2* | 9/2003 | Parfondry ........... | C08G 18/4804 521/130 |
| 8,642,503 B1* | 2/2014 | Tai ........................... | B01J 20/20 502/402 |
| 2011/0034575 A1* | 2/2011 | Triouleyre ......... | C08G 18/4072 521/137 |
| 2013/0225706 A1* | 8/2013 | Ma ..................... | C08G 18/4072 521/110 |
| 2015/0065593 A1* | 3/2015 | Yoshitomi .......... | C08G 18/4837 521/110 |
| 2015/0344656 A1* | 12/2015 | Liu ....................... | C08G 18/48 428/313.9 |
| 2016/0002427 A1* | 1/2016 | Pignagnoli ......... | C08G 18/1816 521/130 |
| 2016/0304690 A1* | 10/2016 | Takemoto .......... | C08G 18/6484 |
| 2019/0153145 A1* | 5/2019 | Tang .................. | C08G 18/1816 |

* cited by examiner

*Primary Examiner* — Melissa A Rioja
(74) *Attorney, Agent, or Firm* — Cesari and McKenna, LLP

(57) ABSTRACT

A sponge for oil-water separation, which is prepared by reacting a polyol blend with a polyisocyanate and graphene, in the presence of a catalyst, a foaming agent and a foam stabilizer. The polyol blend includes: a first polyol component having a hydroxyl number of 33 to 60 mg KOH/g and an oxyethylene content of 50 to 80 mol %; a second polyol component having a hydroxyl number of 80 to 300 mg KOH/g and having an oxyethylene content of 50 to 80 mol %; a graft polyol component having a hydroxyl number of 20 to 40 mg KOH/g; a tetrafunctional polyol component having a hydroxyl number of 350 to 650 mg KOH/g; and glycerol.

20 Claims, 3 Drawing Sheets

SPONGE FOR OIL-WATER SEPARATION AND COMPOSITION FOR MAKING THE SAME

CROSS-REFERENCE TO RELATED APPLICATION

This application claims priority of Taiwanese Invention Patent Application No. 107110525, filed on Mar. 27, 2018.

FIELD

The disclosure relates to a sponge, and more particularly to a polyurethane sponge for oil-water separation.

BACKGROUND

U.S. Pat. No. 8,642,503 B1 discloses a superhydrophobic and superoleophilic composite including a porous material and a surface layer. The porous material includes a framework that contains a plurality of skeletons connected with each other and a plurality of interconnecting pores separated by the skeletons (i.e., sponge-like structure). The porous material is made of lignocellulose, cellulose, foamed polymer, polyether, polyvinyl alcohol, melamine, polyurethane, or polyester. The surface layer is coated on surfaces of the skeletons and includes an adhesion medium and a plurality of graphene sheets stuck to the surfaces of the skeletons by the adhesion medium. The composite has a water contact angle of 150-170 degrees (superhydrophobicity), and an oil contact angle of 0-10 degrees (superoleophilicity). Therefore, the composite can be used to absorb oil or organic pollutants in water, thereby achieving oil-water separation.

However, due to the superhydrophobicity of the composite, water cannot flow therethrough. Since oil has a specific gravity smaller than that of water, oil would float on water (i.e., water forms a lower layer and oil forms an upper layer). During oil-water separation, the water would be restrained from passing through the composite and massively accumulate above the composite so that the oil may be prevented from effectively contacting with the composite so as to greatly reduce the separation efficiency. Moreover, the accumulated water might destroy the structure of the composite or a device equipped with the composite.

SUMMARY

Therefore, an object of the disclosure is to provide a sponge for oil-water separation and a composition for making the same that can alleviate at least one of the drawbacks of the prior art.

According to the disclosure, the sponge is prepared by reacting (A) a polyol blend with (B) a polyisocyanate and (C) graphene, in the presence of (D) a catalyst, (E) a foaming agent and (F) a foam stabilizer. The (A) polyol blend includes:

a first polyol component having a hydroxyl number ranging from 33 mg KOH/g to 60 mg KOH/g and having an oxyethylene content ranging from 50 mol % to 80 mol %;

a second polyol component having a hydroxyl number ranging from 80 mg KOH/g to 300 mg KOH/g and having an oxyethylene content ranging from 50 mol % to 80 mol %;

a graft polyol component having a hydroxyl number ranging from 20 mg KOH/g to 40 mg KOH/g;

a tetrafunctional polyol component having a hydroxyl number ranging from 350 mg KOH/g to 650 mg KOH/g; and glycerol.

According to the disclosure, the composition includes the above-mentioned components: (A) polyol blend; (B) polyisocyanate; (C) graphene; (D) catalyst; (E) foaming agent; and (F) foam stabilizer.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
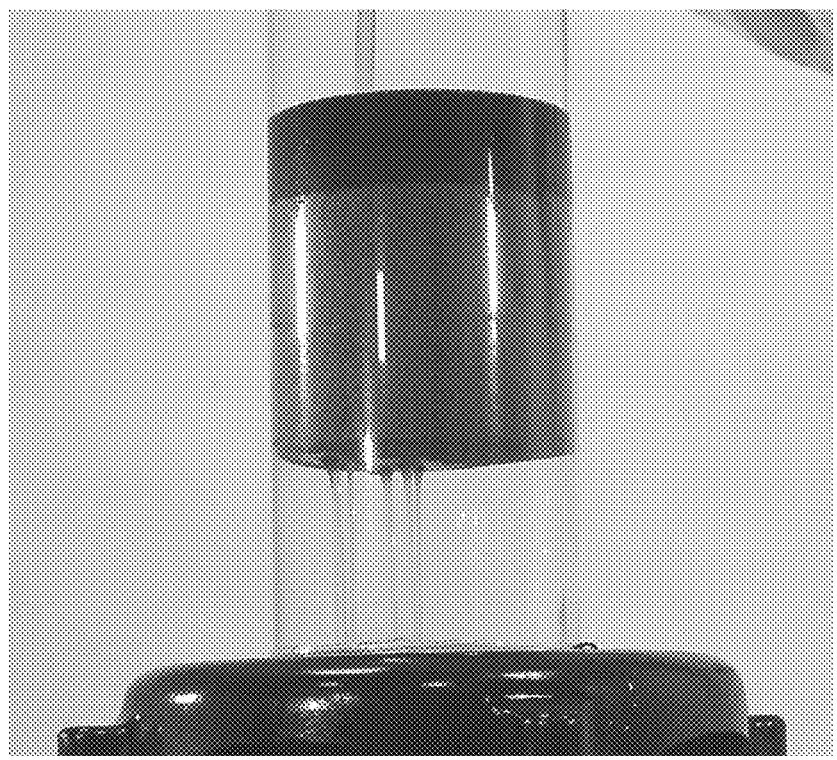
FIGS. 1 to 3 are photographs showing oil-water separation effect of a sponge of this disclosure.

Unless defined otherwise, all technical and scientific terms used herein have the meaning commonly understood by a person skilled in the art to which the present disclosure belongs.

One skilled in the art will recognize many methods and materials similar or equivalent to those described herein, which could be used in the practice of the present disclosure. Indeed, the present disclosure is in no way limited to the methods and materials described.

According to the disclosure, a composition provided to prepare a sponge for oil-water separation includes the following components:

(A) a polyol blend;
(B) a polyisocyanate;
(C) graphene;
(D) a catalyst;
(E) a foaming agent; and
(F) a foam stabilizer.

The details of each component are further described below.

<Polyol Blend>

According to this disclosure, the (A) polyol blend includes:

a first polyol component having a hydroxyl number ranging from 33 mg KOH/g to 60 mg KOH/g and having an oxyethylene content ranging from 50 mol % to 80 mol %;

a second polyol component having a hydroxyl number ranging from 80 mg KOH/g to 300 mg KOH/g and having an oxyethylene content ranging from 50 mol % to 80 mol %;

a graft polyol component having a hydroxyl number ranging from 20 mg KOH/g to 40 mg KOH/g;

a tetrafunctional polyol component having a hydroxyl number ranging from 350 mg KOH/g to 650 mg KOH/g; and glycerol.

In certain embodiments, the first polyol component has a hydrophilic-lipophilic balance (HLB) value ranging from 5 to 12. In certain embodiments, the first polyol component has a weight average molecular weight ranging from 2500 to 5000 Dalton.

In certain embodiments, the second polyol component has a hydrophilic-lipophilic balance (HLB) value ranging from 7 to 14. In certain embodiments, the second polyol component has a weight average molecular weight ranging from 400 to 1900 Dalton.

According to this disclosure, the first polyol component and the second polyol component may be independently a polyester polyol, a polyether polyol or a polyester polyether polyol, and may be a single polyol or a mixture of two or more polyols. The first and second polyol components may be synthesized using any well-known methods, or may be obtained as commercial products. For example, the first and second polyol components may be independently prepared from a mixture of polyester, polyether, oxyethylene (serving as a modifier) and triethanolamine (serving as an initiator).

In certain embodiments, the first polyol component is present in an amount of from 30 to 70 wt % based on the total weight of the components (A), (D), (E) and (F). In certain embodiments, the second polyol component is present in an amount of from 15 to 50 wt % based on the total weight of the components (A), (D), (E) and (F).

In certain embodiments, the graft polyol component has a weight average molecular weight ranging from 4000 to 10000 Dalton. Examples of the graft polyol component suitable for use in this disclosure include, but are not limited to, a vinyl monomer-grafted polyester polyol, a vinyl monomer-grafted polyether polyol and the combination thereof. The graft polyol component may be a commercial product which includes, but is not limited to, POP-3428 and POP-3628 (Mitsui Chemicals Inc.), ARCOL® Polyol HS-100 (Bayer MaterialScience LLC.), and POP-H45 (Zibo Dexin Lianbang Chemical Industry Co., Ltd.).

In certain embodiments, the graft polyol component is present in an amount of from 10 to 30 wt % based on the total weight of the components (A), (D), (E) and (F).

In certain embodiments, the tetrafunctional polyol component has a weight average molecular weight ranging from 300 to 800 Dalton. Examples of the tetrafunctional polyol component include, but are not limited to, pentaerythritol polyether polyol. The tetrafunctional polyol component may be a commercial product which includes, but is not limited to, polyether polyol M-4050 (Bayer Co.), Voranol® 490 (Dow Chemical Co.), etc.

In certain embodiments, the tetrafunctional polyol component is present in an amount of from 1 to 5 wt % based on the total weight of the components (A), (D), (E) and (F).

In certain embodiments, the glycerol is present in an amount of from 1 to 5 wt % based on the total weight of the components (A), (D), (E) and (F).

Without wishing to be bound by any theory, it is believed that the above polyol components in combination, particularly within the weight range as defined above, may impart the sponge thus prepared with oleophilicity and hydrophilicity properties, and increase the mechanical strength and tear resistance of the sponge (i.e., a dense structure, a fine cell structure, a desirable surface topography and/or a desirable hardness), thereby facilitating absorption and percolation of oil and water so as to improve the oil-water separation.

<Polyisocyanate>

According to this disclosure, the (B) polyisocyanate is added to achieve desirable foaming activity of the composition so as to prepare a sponge with a desirable crosslinking density. In certain embodiments, the polyisocyanate may be an aromatic diisocyanate. Examples of the aromatic diisocyanate include, but are not limited to, toluene diisocyanate (TDI), methylene diphenyl diisocyanate (MDI), and the combination thereof.

In certain embodiments, the polyisocyanate is present in an amount of from 30 to 50 parts by weight based on 100 parts by weight of the combination of the components (A), (D), (E) and (F).

<Graphene>

Graphene is added to improve the hydrophobicity of the sponge thus prepared, thereby achieving a desirable oil-absorbing capacity. In certain embodiments, the graphene is present in an amount of from 0.5 to 2 parts by weight based on 100 parts by weight of the combination of the components (A), (D), (E) and (F). If the amount of graphene is below 0.5 parts by weight based on 100 parts by weight of the combination of the components (A), (D), (E) and (F), the oil-absorbing capacity of the sponge would be unsatisfactory. If the amount of graphene is above 2 parts by weight based on 100 parts by weight of the combination of the components (A), (D), (E) and (F), the operational difficulty and cost for preparing the sponge would be increased.

<Catalyst>

According to this disclosure, the (D) catalyst is added to control the cream time and curing time during the reaction of the composition to form the sponge. Examples of the catalyst include, but are not limited to, triethylene diamine, dipropylene glycol and the combination thereof. In an exemplary embodiment, the catalyst is a mixture of 33 wt % of triethylene diamine and 67 wt % of dipropylene glycol.

In certain embodiments, the catalyst is present in an amount of from 0.2 to 1.0 wt % based on the total weight of the components (A), (D), (E) and (F). If the amount of the catalyst is below 0.2 wt % based on the total weight of the components (A), (D), (E) and (F), it may be more difficult to form the composition. If the amount of the catalyst is above 1.0 wt % based on the total weight of the components (A), (D), (E) and (F), the reaction may occur too fast, and a desired open cell structure may not be formed.

<Foaming Agent>

There is no particular restriction on the (E) foaming agent in the present disclosure, as long as the foaming agent could be used to prepare a polyurethane sponge. For example, the foaming agent may be water. The foaming reaction, if conducted by reacting water with polyisocynate to generate carbon dioxide, would be less toxic and could prevent the foaming agent from remaining in the sponge thus prepared.

The amount of the foaming agent could be adjusted based on the density of the sponge to be obtained. In certain embodiments, the foaming agent is present in an amount of from 0.7 to 4.0 wt % based on the total weight of the components (A), (D), (E) and (F). If the amount of the foaming agent is below 0.7 wt % based on the total weight of the components (A), (D), (E) and (F), the density of the sponge and the manufacture cost may be increased. If the amount of the foaming agent is above 4.0 wt % based on the total weight of the components (A), (D), (E) and (F), the density of the sponge may become too low and the oleophilicity and/or hydrophilicity is adversely affected.

<Foam Stabilizer>

According to this disclosure, the (F) foam stabilizer is added to increase miscibility of all the components in the composition, and to control the pore size and uniform distribution of the cells in the sponge. Moreover, the (F) foam stabilizer may facilitate in maintaining air in the foam and preventing the foam from collapsing during formation of the sponge. Examples of the foam stabilizer include, but are not limited to, organic silicone surfactants.

The amount of the foam stabilizer could be adjusted based on the density of the sponge to be obtained. In certain embodiments, the foam stabilizer is present in an amount of from 0.5 to 2.0 wt % based on the total weight of the components (A), (D), (E) and (F). If the amount of the foam stabilizer is below 0.5 wt % based on the total weight of the components (A), (D), (E) and (F), the cells of the sponge may not be formed. If the amount of the foam stabilizer is above 2.0 wt % based on the total weight of the components (A), (D), (E) and (F), the sponge may have few open cell structure (relative to closed cell structure) and thus may shrink.

According to this disclosure, a sponge for oil-water separation is prepared by reacting the above-mentioned (A) polyol blend with (B) polyisocyanate and (C) graphene, in the presence of the components (D) catalyst, (E) foaming agent and (F) foam stabilizer. The operating procedures and conditions of the reaction are within the expertise and routine skills of those skilled in the art. For example, the reaction may be conducted at a temperature ranging from 25° C. to 35° C. for 60 to 120 seconds.

There is no particular restriction on the density of the sponge of the present disclosure, as long as the sponge could maintain a fixed shape. In certain embodiments, the sponge has a density ranging from 25 kg/m$^3$ to 100 kg/m$^3$. If the density is below 25 kg/m$^3$, the sponge may have less dense structure and less oil-absorbing capacity. If the density is over 100 kg/m$^3$, the manufacturing cost for the sponge would be increased.

In certain embodiments, the sponge has a pore density ranging from 25 pores per inch (PPI) to 50 PPI. If the pore density is below 25 PPI, the sponge may have lower oil absorption efficiency, even though the rate of water percolation is increased. If the pore density is above 50 PPI, the sponge may have lower rate of water percolation, even though the oil absorption efficiency and the rate of oil absorption are increased.

A method for making an example of the sponge of this disclosure is described below.

30 to 50 parts by weight of methylene diphenyl diisocyanate (MDI) and 0.5 to 2 parts by weight of graphene were mixed with 100 parts by weight of a combination of the components as shown in Table 1 at 25° C. with normal pressure under agitation.

TABLE 1

| Components | Hydroxyl number (mg KOH/g) | Molecular weight (Dalton) | HLB value | Oxyethylene content (mol %) | Amount (wt %) |
| --- | --- | --- | --- | --- | --- |
| First polyol | 33-60 | 2500-5000 | 5-12 | 50-80 | 30-70 |
| Second polyol | 80-300 | 400-1900 | 7-14 | 50-80 | 15-50 |
| Graft polyol | 20-40 | 4000-10000 | — | — | 10-30 |
| Tetrafunctional polyol | 350-650 | 300-800 | — | — | 1-5 |
| Glycerol | 1827 | — | — | — | 1-5 |
| Water | — | — | — | — | 0.7-4 |
| Catalyst[1] | — | — | — | — | 0.2-1 |
| Silicone oil | — | — | — | — | 0.5-2 |
| Total | | | | | 100 |

[1] A mixture of 33 wt % of triethylene diamine and 67 wt % of dipropylene glycol.

The resultant composition was placed in a mold and subjected to reaction at 20° C. to 35° C. for 60 seconds to 120 seconds, so as to form a sponge having a density ranging from 25 kg/m$^3$ to 100 kg/m$^3$ and a pore density ranging from 25 PPI to 50 PPI.

The effect of oil-water separation of the obtained sponge was analyzed as follows. First, the sponge was cut to obtain three cylindrical pieces, each having a diameter of 15.5 cm and a thickness of 5 cm. The three cylindrical pieces were stacked on one another to form a sponge sample, followed by disposing the sponge sample into a cylindrical column (having a diameter of 15.5 cm and a thickness of 400 cm). An oil-water mixture composed of 1 liter of water and 0.8 liter of wasted engine oil was poured into the cylindrical column. The absorption of wasted engine oil by the sponge sample and the percolation of water through the sponge sample were observed.

Figure 2:
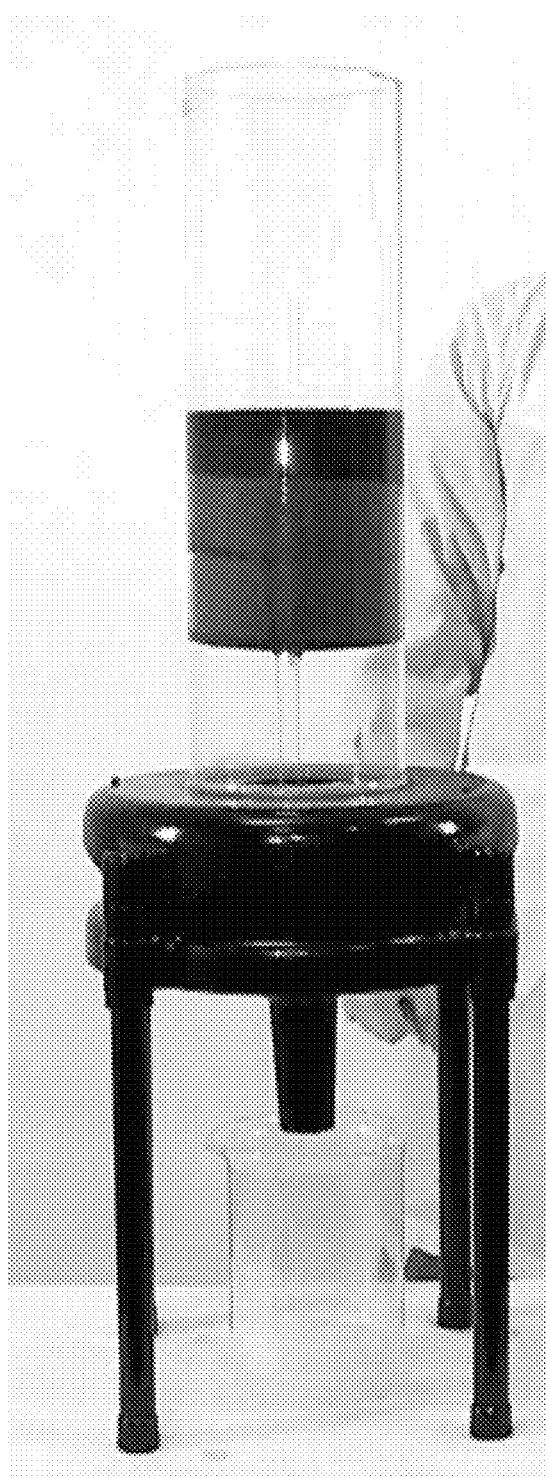
Figure 3:
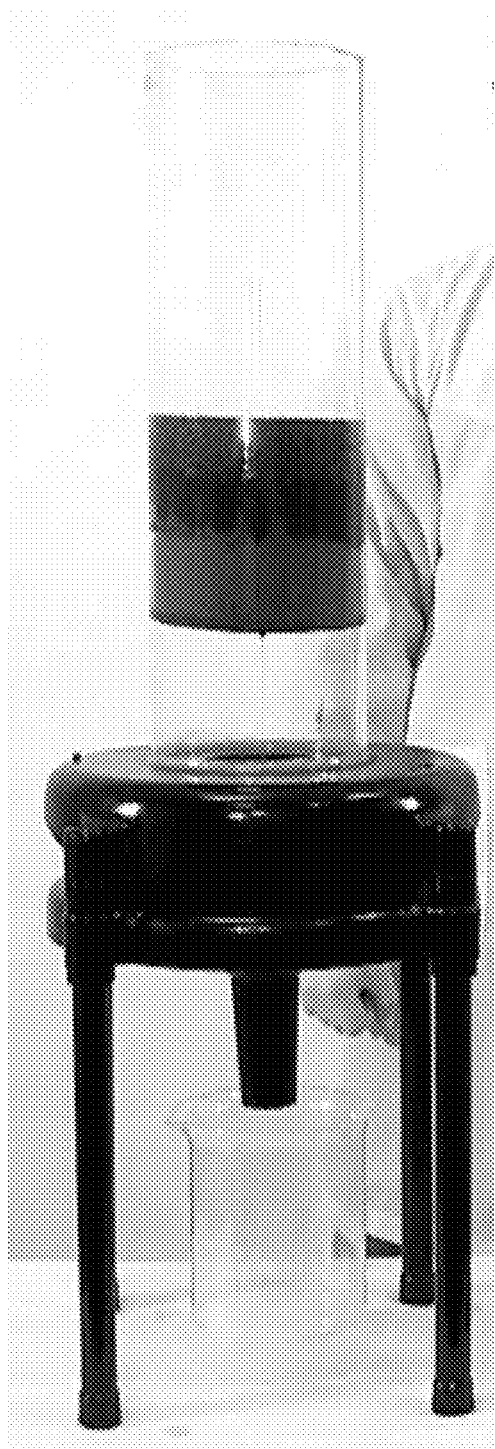

As shown in FIGS. 1 and 2, it can be seen that, within 3 seconds after the oil-water mixture was poured into the cylindrical column, the water in the oil-water mixture was absorbed by the sponge and the water that could not be absorbed by the sponge then flowed out of the sponge sample. In addition, the wasted engine oil was absorbed by and retained in the top cylindrical piece of the sponge sample within 5 seconds after the pour of the oil-water mixture. At about 30 seconds after the pour of the oil-water mixture, approximately 80 vol % of the water in the oil-water mixture flowed through and out of the sponge, and the separation of the engine oil from the water was almost completed, and the sponge stopped sinking (the sponge sample was sinking during the separation of the engine oil from the water because the sponge sample absorbed the water and the engine oil in the oil-water mixture and because of the drawing force caused by the water flowing out of the sponge (see FIG. 3)). These results indicate that the sponge is effective in absorbing a large amount of oil (i.e., exhibiting excellent oil-absorbing capacity), and effective in water percolation, so that the oil and the water may be continuously separated.

To sum up, the sponge prepared from the composition according to this disclosure could effectively absorb oil and water, then retains oil therein and allows water flowing therethrough, thereby exhibiting an improved and continuous oil-water separation effect.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A sponge for separation of oil and water, which is prepared by reacting (A) a polyol blend with (B) a polyisocyanate, in the presence of (C) graphene, (D) a catalyst, (E) a foaming agent and (F) a foam stabilizer; wherein said (A) polyol blend includes:
   a first polyol component having a hydroxyl number ranging from 33 mg KOH/g to 60 mg KOH/g and having an oxyethylene content ranging from 50 mol % to 80 mol %;
   a second polyol component having a hydroxyl number ranging from 80 mg KOH/g to 300 mg KOH/g and having an oxyethylene content ranging from 50 mol % to 80 mol %;
   a graft polyol component having a hydroxyl number ranging from 20 mg KOH/g to 40 mg KOH/g;

a tetrafunctional polyol component having a hydroxyl number ranging from 350 mg KOH/g to 650 mg KOH/g; and glycerol, in which said first polyol component is present in an amount of from 30 to 70 wt % based on the total weight of said components (A), (D), (E), and (F).

2. The sponge of claim 1, wherein said first polyol component has a hydrophilic-lipophilic balance (HLB) value ranging from 5 to 12.

3. The sponge of claim 1, wherein said second polyol component has a HLB value ranging from 7 to 14.

4. The sponge of claim 1, wherein said second polyol component is present in an amount of from 15 to 50 wt % based on the total weight of said components (A), (D), (E), and (F).

5. The sponge of claim 1, wherein said first polyol component has a weight average molecular weight ranging from 2500 to 5000 Dalton.

6. The sponge of claim 1, wherein said second polyol component has a weight average molecular weight ranging from 400 to 1900 Dalton.

7. The sponge of claim 1, wherein said graft polyol component has a weight average molecular weight ranging from 4000 to 10000 Dalton.

8. The sponge of claim 1, wherein said tetrafunctional polyol component has a weight average molecular weight ranging from 300 to 800 Dalton.

9. The sponge of claim 1, wherein said graft polyol component is present in an amount of from 10 to 30 wt % based on the total weight of said components (A), (D), (E), and (F).

10. The sponge of claim 1, wherein said tetrafunctional polyol component is present in an amount of from 1 to 5 wt % based on the total weight of said components (A), (D), (E), and (F).

11. The sponge of claim 1, wherein said glycerol is present in an amount of from 1 to 5 wt % based on the total weight of said components (A), (D), (E), and (F).

12. The sponge of claim 1, wherein said graphene is present in an amount of from 0.5 to 2 parts by weight based on 100 parts by weight of the combination of said components (A), (D), (E), and (F).

13. The sponge of claim 1, wherein said polyisocyanate is present in an amount of from 30 to 50 parts by weight based on 100 parts by weight of the combination of said components (A), (D), (E), and (F).

14. The sponge of claim 1, which has a density ranging from 25 kg/m$^3$ to 100 kg/m$^3$.

15. The sponge of claim 1, which has a pore density ranging from 25 pores per inch (PPI) to 50 PPI.

16. A sponge for separation of oil and water, which is prepared by reacting (A) a polyol blend with (B) a polyisocyanate, in the presence of (C) graphene, (D) a catalyst, (E) a foaming agent, and (F) a foam stabilizer; wherein said (A) polyol blend includes:

a first polyol component having a hydroxyl number ranging from 33 mg KOH/g to 60 mg KOH/g and having an oxyethylene content ranging from 50 mol % to 80 mol %;

a second polyol component having a hydroxyl number ranging from 80 mg KOH/g to 300 mg KOH/g and having an oxyethylene content ranging from 50 mol % to 80 mol %;

a graft polyol component having a hydroxyl number ranging from 20 mg KOH/g to 40 mg KOH/g;

a tetrafunctional polyol component having a hydroxyl number ranging from 350 mg KOH/g to 650 mg KOH/g; and glycerol, in which said second polyol component is present in an amount of from 15 to 50 wt % based on the total weight of said components (A), (D), (E), and (F).

17. The sponge of claim 16, which has a density ranging from 25 kg/m$^3$ to 100 kg/m$^3$.

18. The sponge of claim 16, which has a pore density ranging from 25 pores per inch (PPI) to 50 PPI.

19. A sponge for separation of oil and water, which is prepared by reacting (A) a polyol blend with (B) a polyisocyanate, in the presence of (C) graphene, (D) a catalyst, (E) a foaming agent, and (F) a foam stabilizer; wherein said (A) polyol blend includes:

a first polyol component having a hydroxyl number ranging from 33 mg KOH/g to 60 mg KOH/g and having an oxyethylene content ranging from 50 mol % to 80 mol %;

a second polyol component having a hydroxyl number ranging from 80 mg KOH/g to 300 mg KOH/g and having an oxyethylene content ranging from 50 mol % to 80 mol %;

a graft polyol component having a hydroxyl number ranging from 20 mg KOH/g to 40 mg KOH/g;

a tetrafunctional polyol component having a hydroxyl number ranging from 350 mg KOH/g to 650 mg KOH/g; and glycerol, in which said graft polyol component is present in an amount of from 10 to 30 wt % based on the total weight of said components (A), (D), (E), and (F).

20. The sponge of claim 19, which has a density ranging from 25 kg/m$^3$ to 100 kg/m$^3$.

* * * * *